2,857,587

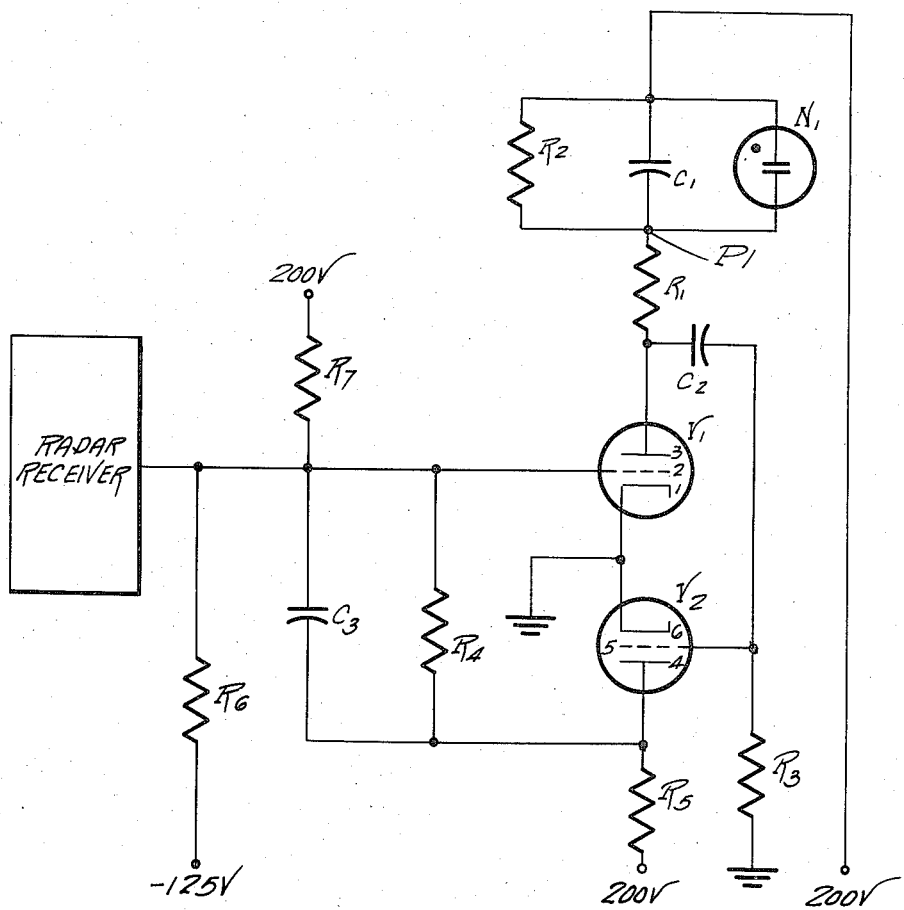

PULSE TRAIN INDICATOR

Robert D. Tollefson, Cedar Rapids, Iowa, and Jefferson R. Wilkerson, Westbury, N. Y., assignors, by mesne assignments, to the United States of America as represented by the Secretary of the Navy Application October 17, 1955, Serial No. 541,107

1 Claim. (Cl. 340—248)

The present invention relates to a radar receiver, and more particularly to an electronic circuit for indicating the presence of a train of radar echo pulses, but not a single pulse.

The output of a radar echo receiver includes many pulses in addition to desirable radar echo target pulses. The spurious pulses called noise are generally small; however, at times, a noise pulse may assume the magnitude and other characteristics of a true radar target signal. One difference between noise pulses and true radar return pulses is that true radar return pulses recur, while noise pulses are erratic. Therefore, in the past, radar operators continually analyzed the output pulses of a radar receiver mentally comparing not only the amplitude of the output pulses with each other but also mentally nothing whether a pulse recurs.

Accordingly, one of the main objects of the present invention is to improve radar operation by providing a device for indicating radar pulses that have the characteristics of expected received signals, but not pulses that have characteristics attributable to noise.

Another object of this invention is to provide electronic circuit means for transforming the short output pulse of a radar receiver to a long output pulse.

Other objects and many of the attendant advantages of this invention will be readily appreciated as the same becomes better understood by reference to the following detailed description when considered in connection with the accompanying drawing wherein:

Figure 1 is a schematic diagram of the output indicator.

Referring now in greater detail to the figure of the drawing, there is shown a multivibrator comprising triode tubes V1 and V2 coupled to the radar receiver to receive the output pulses therefrom. If desired, tubes V1 and V2 may be formed as a single tube having cathodes 1 and 6 connected within the tube. The output of the multivibrator is connected in series with a visual indicating system R2, C1, N1.

The radar receiver is connected to grid 2 of tube V1 and through resistor R6 to a negative 125 volt power supply. Grid 2 is also connected through resistor R7 to a 200 volt power supply and through a parallel resistance capacitance combination R4 and C3 to plate 4 of tube V2. Plate 4 of tube V2 is also connected through resistor R5 to a 200 volt power supply. Cathodes 1 and 6 of tubes V1 and V2, respectively, are connected to each other and are grounded. Plate 3 of tube V1 is connected through capacitance C2 to grid 5 of tube V2. Grid 5 of tube V2 is grounded through resistor R3. Plate 3 of tube V1 is also connected through resistor R1, and parallel connected resistor R2, capacitor C1, and neon tube N1, to a 200 volt power supply.

Operation

During the steady state condition tube V1 is cut off due to a negative bias on grid 2 of V1, and tube V2 is conducting. When the radar receiver receives a return signal, a positive receiver output pulse drives control grid 2 of tube V1 positive. Tube V1 begins to conduct, current flows through resistors R1 and R2, and plate 3 of V1 goes negative. The negative pulse from plate 3 of V1 is put through capacitor C2 to grid 5 of V2. The negative bias on grid 5 of tube V2 causes a reduction in the flow of current through this tube. This reduction of current flow through tube V2 causes a smaller voltage drop across resistor R5 and hence an increase in the plate potential of plate 4 of tube V2. That positive pulse is fed through capacitor C3 to grid 2 of V1 to thereby make grid 2 of V1 more positive. This causes tube V1 to conduct heavily and to provide more negative bias on grid 5 of tube V2 to eventually, completely cut off tube V2.

The circuit remains in this condition as long as the discharge of C2 maintains a sufficient negative potential on the grid of V2 to keep the tube cut off. When C2 has discharged sufficiently to allow the grid of V2 to become more positive so that all of the electrons from cathode 6 are not repelled by grid 5, tube V2 will begin to conduct. As tube V2 conducts, plate 4 potential decreases. The decrease is passed to the grid of V1 causing plate 3 current to decrease and plate 3 potential to rise. This plate potential rise is impressed on grid 5 of tube V2 which increases the plate current in V2. This action takes place almost instantly, so that V2 is quickly returned to its normal state of conduction and V1 is again cut off by the negative bias on grid 2.

As described above, a positive return radar signal will cause grid 2 of tube V1 to go more nositive, to cause an increase in current through plate 3 circuit. This increase in current will cause a greater voltage drop across resistor R2 and hence the voltage at point P1 will decrease to thereby increase the potential across capacitor C1 and neon tube N1. It is to be appreciated that the positive return radar pulse is of relatively short duration as compared with the time interval during which V1 is conducting and the current through resistor R2 is increasing. Therefore in effect, the multivibrator lengthens the radar return pulse to be impressed on neon bulb N1 and capacitor C1. The long output pulse of the multivibrator plate 3 charges capacitor C1 to a voltage slightly less than the ignition potential of neon bulb N1. After tube V1 has been cut off the charge on capacitor C1 will gradually be dissipated through resistor R2. However, if a true radar target signal is being impressed on grid 2, a second radar return signal will trigger the multivibrator and hence further charge capacitor C1 before capacitor C1 has completely discharged. The second output pulse will charge the capacitor to a potential above the ignition potential of the neon bulb and the bulb will fire, giving a visual indication of the presence of signal. The discharge time constant is adjusted so that pulses due to noise will not fire the neon bulb, but two successive pulses from a radar with ordinary pulse repetition frequency will.

Obviously many modifications and variations of the present invention are possible in the light of the above teachings. It is therefore to be understood that within the scope of the appended claim the invention may be practiced otherwise than as specifically described.

What is claimed is:

Circuitry for discriminating between radar echo signals of a radar receiver and random noise said circuitry comprising a multivibrator coupled to the output of the radar receiver, and adapted to transform output signals from said radar receiver into pulses of longer duration; a capacitor element series connected in the output circuit of the multivibrator; and a neon tube connected in parallel with the capacitor element, the firing potential of the neon tube being higher than the charge developed across the capacitor element by a single pulse in the output pulse of the receiver, and the discharge time constant of the capacitor element being so fixed with respect to the repetition frequency of the radar echo signals that successive radar echo signals will develop a potential across the capacitor element greater than the ignition potential of the neon tube.

References Cited in the file of this patent

UNITED STATES PATENTS

| | | |
|---|---|---|
| 2,110,015 | Fitzgerald | Mar. 1, 1938 |
| 2,374,248 | Tuttle | Apr. 24, 1945 |
| 2,380,520 | Hassler | July 31, 1945 |
| 2,428,058 | Wise | Sept. 30, 1947 |
| 2,491,029 | Brunn | Dec. 13, 1949 |
| 2,517,599 | Reeves | Aug. 8, 1950 |
| 2,536,808 | Higinbotham | Jan. 2, 1951 |
| 2,541,052 | Harris | Feb. 13, 1951 |